United States Patent
Kozakai

(10) Patent No.: US 9,348,629 B2
(45) Date of Patent: May 24, 2016

(54) APPARATUS, SYSTEM, METHOD AND COMPUTER-READABLE MEDIUM FOR SCHEDULING IN WHICH A CHECK POINT IS SPECIFIED

(71) Applicant: KABUSHIKI KAISHA TOSHIBA, Tokyo (JP)

(72) Inventor: Yasuyuki Kozakai, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 272 days.

(21) Appl. No.: 13/966,785

(22) Filed: Aug. 14, 2013

(65) Prior Publication Data
US 2014/0053153 A1    Feb. 20, 2014

(30) Foreign Application Priority Data

Aug. 15, 2012    (JP) .................. 2012-180120

(51) Int. Cl.
*G06F 9/455*    (2006.01)
*G06F 9/50*    (2006.01)

(52) U.S. Cl.
CPC ........ *G06F 9/45533* (2013.01); *G06F 9/45558* (2013.01); *G06F 9/5088* (2013.01); *G06F 2009/4557* (2013.01)

(58) Field of Classification Search
None
See application file for complete search history.

(56) References Cited

U.S. PATENT DOCUMENTS

| 7,086,057 B2 | 8/2006 | Hayashi | |
|---|---|---|---|
| 2001/0039581 A1* | 11/2001 | Deng et al. | 709/226 |
| 2007/0002762 A1* | 1/2007 | Matsumoto et al. | 370/252 |
| 2008/0163228 A1* | 7/2008 | Murata et al. | 718/103 |
| 2009/0228589 A1* | 9/2009 | Korupolu | 709/226 |
| 2010/0077449 A1* | 3/2010 | Kwok et al. | 726/3 |
| 2010/0325279 A1* | 12/2010 | Heim | 709/226 |
| 2011/0138384 A1* | 6/2011 | Bozek et al. | 718/1 |
| 2011/0239215 A1* | 9/2011 | Sugai | 718/1 |
| 2013/0311988 A1* | 11/2013 | Boss et al. | 718/1 |

FOREIGN PATENT DOCUMENTS

| JP | 2002-342097 | 11/2002 |
|---|---|---|
| JP | 2010-113677 | 5/2010 |

OTHER PUBLICATIONS

Office Action mailed Jul. 8, 2014 in counterpart Japanese Patent Application No. 2012-180120 and English-language translation thereof.

(Continued)

*Primary Examiner* — Adam Lee
(74) *Attorney, Agent, or Firm* — Nixon & Vanderhye, P.C.

(57) ABSTRACT

A scheduling apparatus according to an example embodiment includes a controller. The controller determines whether a resource of a second processor in a second terminal device can execute a group including at least one virtual machine in a first terminal in addition to virtual machines in the second terminal device by each combination of a cycle and an executing period per cycle. The controller specifies a cycle and an executing period of which a ratio of the executing period to the cycle is the smallest from among pairs of a cycle and an executing period for which the controller determines that the group can be executed, and assigns the specified cycle and the specified executing period to the group including the at least one of the one or more virtual machines in the first terminal in addition to the one or more virtual machines in the second terminal device.

7 Claims, 11 Drawing Sheets

(56) References Cited

OTHER PUBLICATIONS

Office Action mailed Sep. 30, 2014 in counterpart Japanese Patent Application No. 2012-180120 and English-language translation thereof.

Lee, J. et al., "Realizing Compositional Scheduling Through Virtualization", IEEE Computer Society, 2012 IEEE 18th Real Time and Embedded Technology and Applications Symposium, (2012), pp. 13-22.

* cited by examiner

FIG.5

| PROCESSOR ID | PERFORMANCE VALUE (ABSOLUTE VALUE) | VIRTUAL MACHINE ID | TASK ID | TASK REQUIREMENT | |
|---|---|---|---|---|---|
| | | | | CYCLE (p) | RUN-TIME (e) |
| 131 | 1.0 | 140 | 142 | 32 | 3 |
| | | | 143 | 50 | 3 |
| | | 150 | 152 | 35 | 1 |
| | | | 153 | 30 | 9 |

FIG.6

| PROCESSOR ID | PERFORMANCE VALUE (ABSOLUTE VALUE) | VIRTUAL MACHINE ID | TASK ID | TASK REQUIREMENT | |
|---|---|---|---|---|---|
| | | | | CYCLE (p) | RUN-TIME (e) |
| 161 | 2.0 | 170 | 172 | 66 | 2 |
| | | | 173 | 92 | 1 |
| | | | 174 | 27 | 2 |

FIG.7

```
1    W' ← φ
2    for T in W do
3            e'(i) ← ⌈e(i) · φ(c')/φ(c)⌉
4            T' ← (p(i), e'(i))
5            W' ← W' ∪ {T'}
6    end
7    U ← φ
8    for T' in W' do
9            j ← 1
10           while j · p(i) ≤ p(n) do
11                   U ← U ∪ {j · p(i)}
12           end
13   end
14   sort(U)
15   k ← 1
16   for i in [1, n] do
17           while u(k) ≤ p(i) do
18                   if rbf(W', i, u(k)) ≤ sbf(Γ, u(k))
19                           break
20                   end
21                   if u(k) = p(i)
22                           return false
23                   end
24                   k ← k + 1
25           end
26   end
27   return true
```

FIG.9

```
1    Γ_opt ← (1,1)
2    Θ_first ← 1
3    for Π in [1, p(n)] do
4        for Θ in [Θ_first, Π] do
5            Γ ← (Π, Θ)
6            if B(Γ) > B(Γ_opt)
7                Θ_first ← Θ
8                break
9            else if is_schedulable(W, Γ, Φ(C)) = true
10               Γ_opt ← Γ
11               Θ_first ← Θ
12               break
13           else if Θ = Π
14               return error
15           end
16       end
17   end
18   return Γ_opt
```

APPARATUS, SYSTEM, METHOD AND COMPUTER-READABLE MEDIUM FOR SCHEDULING IN WHICH A CHECK POINT IS SPECIFIED

CROSS-REFERENCE TO RELATED APPLICATION(S)

This application is based upon and claims the benefit of priority from the Japanese Patent Application No. 2012-180120, filed on Aug. 15, 2012; the entire contents of which are incorporated herein by reference.

FIELD

Embodiments described herein relate generally to an apparatus, a system, a method and a computer-readable medium for scheduling.

BACKGROUND

Conventionally, there is a virtualization technology by which a plurality of OSs (operating system) can execute on a single device. Furthermore, there is a scheduling algorithm for scheduling processing resources so as to satisfy requirements of dead lines imposed on tasks executed on a virtual machine.

However, the conventional scheduling algorithm requires a long period of time for the process of calculating resources to be allocated to tasks and virtual machines.

BRIEF DESCRIPTION OF THE DRAWINGS

FIG. 5 is an illustration showing an example of information included in a massage sent from a destination node to a management server in the first embodiment;

FIG. 6 is an illustration showing an example of information included in a massage sent from a source node to the management server in the first embodiment;

FIG. 7 is an illustration showing an example of a pseudo-code showing an algorithm of is_schedulable according to the first embodiment;

FIG. 9 is an illustration showing an example of a pseudo-code showing an algorithm of optimal_resource according to the first embodiment;

DETAILED DESCRIPTION

Exemplary embodiments of an apparatus, a system, a method and a computer-readable medium for scheduling will be explained below in detail with reference to the accompanying drawings.

First Embodiment

Firstly, a real-time scheduling apparatus, system and program according to a first embodiment will be described in detail with accompanying drawings. In the first embodiment, it is determined whether processor can execute all the tasks while satisfying requirements of deadlines for all the tasks. Furthermore, in the first embodiment, when requirements of one or more tasks to be executed on a single virtual machine are inputted, an optimal resource to be allocated to the virtual machine will be calculated. In the following description, a resource may be a processor resource, a memory capacity, a network bandwidth, or the like, for instance. Definitions of a task requirement and a resource will be described later on.

Figure 1:
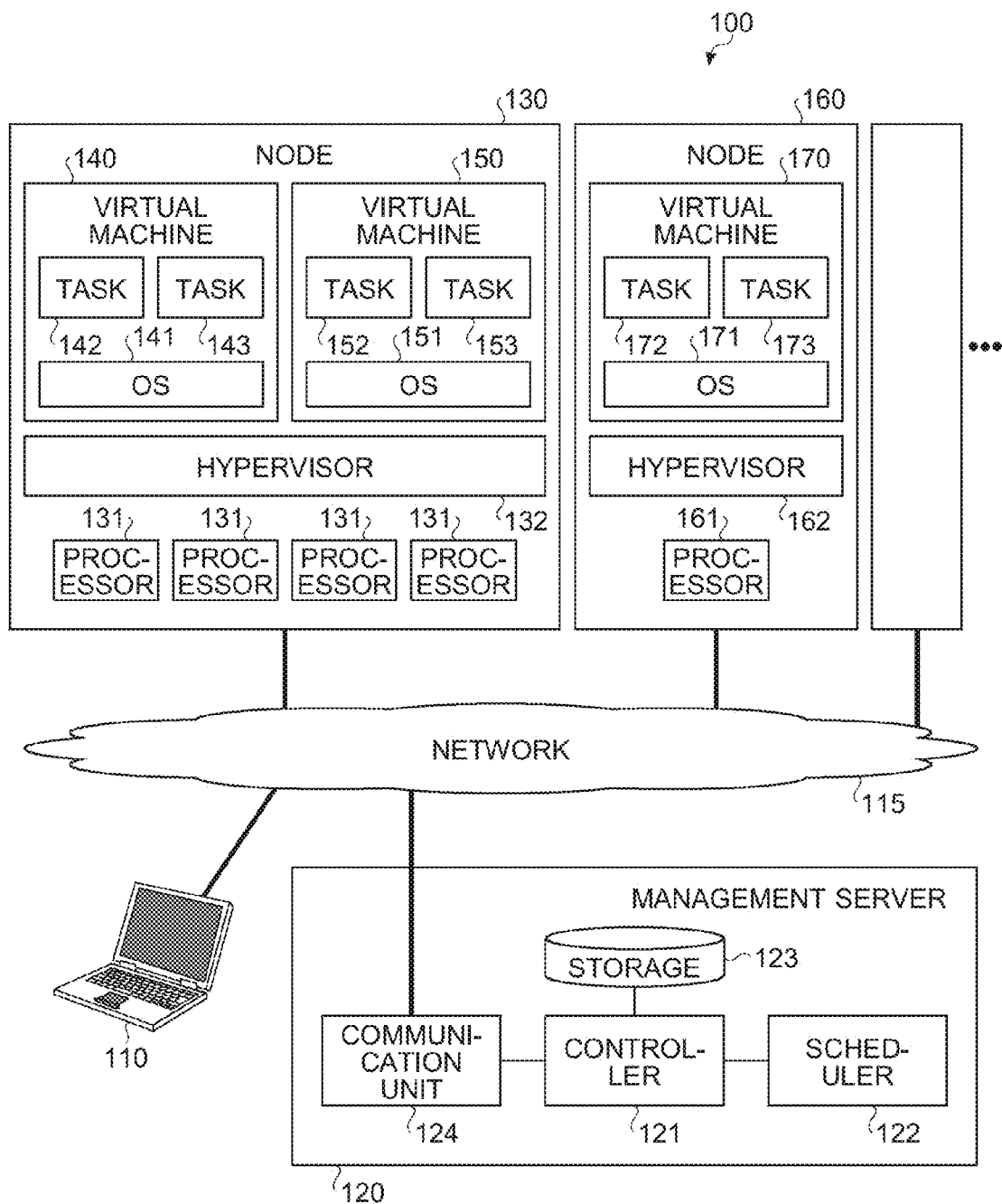
FIG. 1 is a block diagram showing an example of an outline structure of an information processing system according to a first embodiment.

FIG. 1 shows an example of an outline structure of an information processing system according to the first embodiment. As shown in FIG. 1, a information processing system 100 according to the first embodiment has a management server 120 connected with a network 115, one or more nodes 130 and 160, and a client 110. Each node 130 and 160 may be a terminal device located on the network 115, respectively.

The management server 120 includes a communication unit 124, a controller 121, a scheduler 122 and a storage 123. The communication unit 124 may has an Ethernet® processing unit, a TCP/IP stack, a HTTP server, and so forth. Each portion in the communication unit 124 can be constructed as software or hardware. The controller 121 communicates with each hypervisor 132 and 162 in the nodes 130 and 160 and controls virtual machines 140, 150 and 170. For example, the controller 121 orders the hypervisor 132 to create the new virtual machine 140 or 150 in the node 130.

The controller 121 can order the hypervisor 132 to displace the virtual machine 140 executed on one node 130 to the other node 160. Likewise, the controller also can order the hypervisor 162 to displace the virtual machine 170 executed on one node 160 to the other node 130.

The scheduler 122 acquires requirements of one or more tasks from the controller 121, and calculates a resource to be allocated to each of the virtual machines 140, 150 and 170 based on the acquired task requirements. The scheduler 122 outputs the calculated resource to the controller 121.

Each node 130 and 160 is a computer having a processor 131 or 161, a physical memory and a network interface (not shown), and has a hypervisor 132 or 162 constructed as software or hardware, respectively.

The hypervisor 132 provides one or more virtual machines 140 and 150 for allowing execution of one or more OSs on the node 130. For example, the virtual machine 140 executes an OS 141 constructed as software and one or more tasks 142 and 143 respectively constructed as software. For example, the virtual machine 150 executes an OS 151 constructed as software and one or more tasks 152 and 153 respectively constructed as software. Likewise, the hypervisor 162 provides one or more virtual machines 170 for allowing execution of one or more OSs 171 on the node 160. The virtual machine 170 executes an OS 171 constructed as software and one or more tasks 172 and 173 respectively constructed as software.

Here, in the first embodiment, the tasks 142, 143, 152, 153, 172 and 173 are periodic tasks. The periodic task is a task requiring execution of a process within a constant amount at regular intervals.

Figure 2:
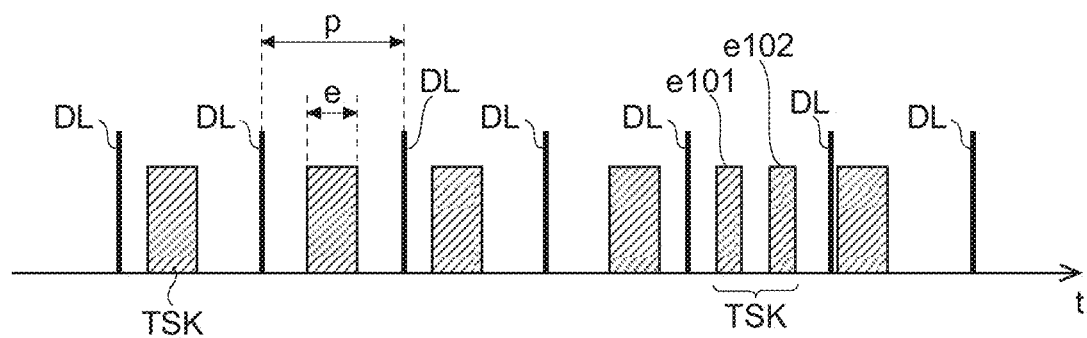
FIG. 2 is an illustration for explaining a definition of a requirement of a periodic task.

A definition of the requirement of the periodic task will be described in detail using FIG. 2. TSK in FIG. 2 shows examples of the periodic tasks. Shadow areas show periods during which the processor executes the periodic tasks TSK. DL shows deadlines of the periodic tasks TSK. Intervals between the deadlines DL are constant. Each requirement of the periodic task TSK is defined by a pair (p, e) being a period p of the deadline DL and a maximum processing period e for processing the periodic task TSK. Units of the period p and the maximum processing period e are decided by a minimum time in which a periodic task TSK can be executed continuously without stopping.

In order to let the periodic task TSK maintain a normal operation, the processor should execute the periodic task TSK for a period of time greater than a maximum processing period e for every period p. For instance, when units of the period p and the maximum processing period e are 1 ms (millisecond) and a requirement of one periodic task TSK is (1, 200), the processor should execute the periodic task TSK for 1 ms for every 200 ms in order to maintain the normal operation of the periodic task TSK. At this time, as shown by executing periods e100 and e102, the processor can divide the periodic task TSK in two or more and execute the divided periodic tasks TSKs during the period e. In this case, a sum of the executing periods e101 and e102 should be equal to or greater than the maximum processing period e.

In the information processing system 100 according to the first embodiment, the processor of the node 130 concurrently executes one or more tasks by switching the running task. However, it is not limited to such structure, while the node 130 can have a plurality of the processors 131 in order to allow execution of a plurality of tasks in parallel.

The OS 141 orders the hypervisor 132 or the processor 131 so that the tasks 142, 143, 152 and 153 in the virtual machines 140 and 150 are switched as necessary. At which time, the task having been ordered to be switched by the OS 141 is limited to the tasks 142 and 143 or the tasks 152 and 153 executed on one of the virtual machines 140 and 150.

The hypervisor 132 orders the processor 131 so that the running virtual machine or the running task is switched as necessary. For instance, the hypervisor 132 switches the running virtual machine to the virtual machine 140 from between the virtual machines 140 and 150. The OS 141 of the selected virtual machine 140 switches the running task to either one from between the tasks 142 and 143. Likewise, the node 160 and the virtual machines 150 and 170 also switch the running virtual machine and the running task. According to the above, scheduling is executed hierarchically.

Figure 3:
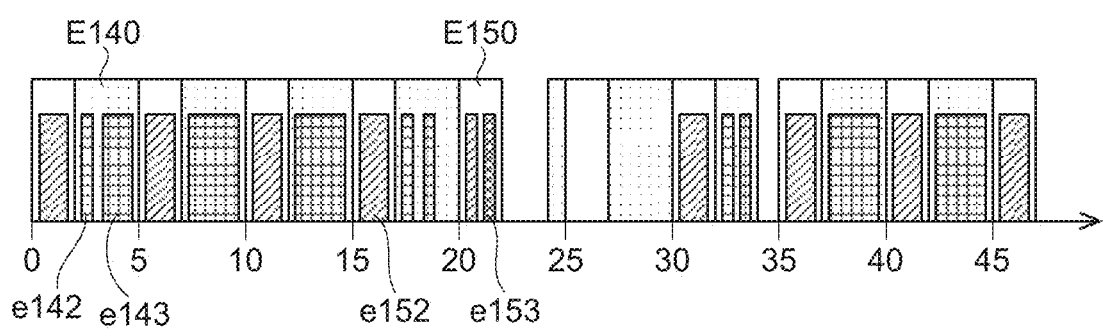
FIG. 3 is an illustration for explaining an example of switching of virtual machines and tasks in the first embodiment.

Examples of switching of virtual machine and switching of task will be explained using FIG. 3. In FIG. 3, periods E140 and E150 represent executing periods of the virtual machines 140 and 150 shown in FIG. 1, respectively. Periods e142, e143, e152 and e153 represent executing periods of the tasks 142, 143, 152 and 153 shown in FIG. 1, respectively.

As shown in FIG. 3, in the period E140 during which the virtual machine 140 is executed, the task 142 or 143 is executed. In the period E150 during which the virtual machine 150 is executed, the task 152 or 153 is executed.

The scheduler 122 shown in FIG. 1 determines whether or not the processor 131 can execute all the periodic tasks including the tasks 142 and 152 in the node 130 while satisfying requirements of all the periodic tasks. Moreover, the scheduler 122 calculates an optimal resource to be allocated to the virtual machines 140 and 150.

A resource to be allocated to a virtual machine is defined by a pair $(\Pi, \Theta)$ being a cycle $\Pi$ during which the virtual machine is executed by a processor and an executing period $\Theta$ per cycle. That is, the virtual machine having the resource $(\Pi, \Theta)$ being allocated to is executed for a period of time $\Theta$ time in total for every cycle $\Pi$. Units of a period $\Pi$ and an executing period $\Theta$ are defined by a minimum time that can be assigned to a virtual machine, for instance.

For example, when a resource $\Gamma$ is (10, 300) and the units of the cycle $\Pi$ and the executing period $\Theta$ are 1 ms, the resource $\Gamma$ indicates that the processor can execute the virtual machine for 10 ms for every 300 ms.

Here, an occupancy of a processor with respect to a certain resource $(\Pi, \Theta)$ is defined as $\Theta/\Pi$. When the occupancy $\Theta/\Pi$ is minimum and the processor 131 can satisfy the requirements of the tasks 142 and 143, the resource to be allocated to the virtual machine 140 will become optimal.

The client 110 shown in FIG. 1 acquires execution statuses of the virtual machines 140, 150 and 170 from the management server 120 in response to a user's instructions. Furthermore, the client 110 sends a massage requesting creation, boot, abort, deletion, or the like, of a virtual machine to the management server 120. Moreover, the client 110 sends a massage requiring switching a node for executing the virtual machine to the management server 120.

Figure 4:
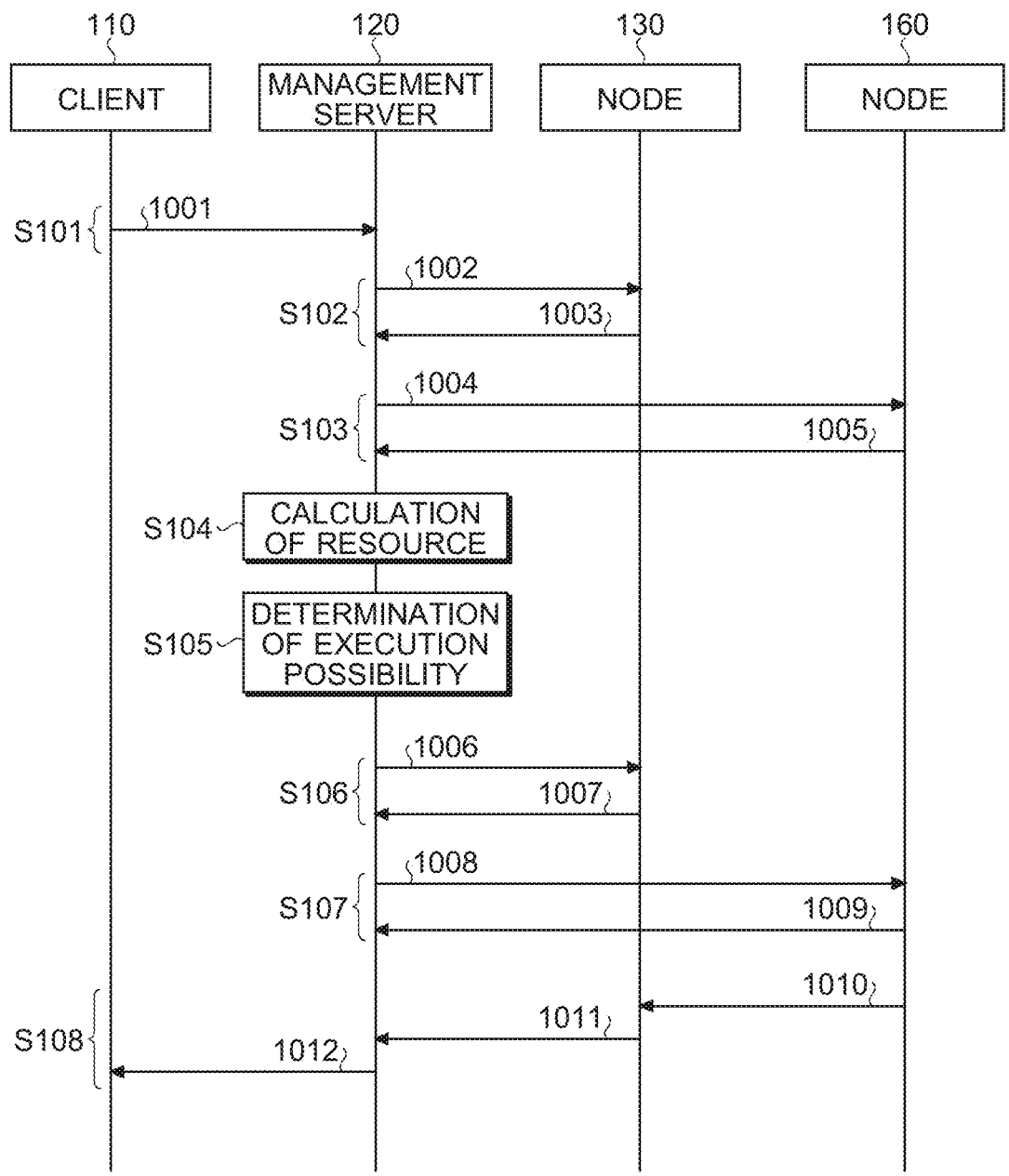
FIG. 4 is a sequence diagram showing an operation of the information processing system according to the first embodiment.

Using a sequence diagram shown in FIG. 4, an operation of the information processing system according to the first embodiment will be described in detail. In various scenarios, a calculation result of a resource obtained by the scheduler 122 shown in FIG. 1 can be used. FIG. 4 shows a sequence diagram in a case where the virtual machine 170 executed on the processor 161 of the node 160 is displaced on the processor 131 of the node 130.

In the sequence shown in FIG. 4, the scheduler 122 determines whether or not the processor 131 has enough resource even if the virtual machine 170 has been displaced on the processor 131. More specifically, the scheduler 122 determines whether or not the processor 131 can satisfy the requirements of all the tasks 172 and 173 in the virtual machine 170 in addition to the requirements of the tasks 142, 143, 152 and 153 now executed by the processor 131. When the scheduler 122 determines that there is enough resource, the scheduler 122 outputs a resource to be allocated to the virtual machine 170 to the controller 121.

As shown in FIG. 4, firstly, in Step S101, the client 110 sends a massage 1001 requesting a displacement of the virtual machine 170 to the management server 120 via the network 115. The communication unit 124 of the management server 120 executes a protocol processing such as Ethernet®, TCP (transmission control protocol), IP (internet protocol), HTTP (HyperText transfer protocol), or the like, on the massage 1001 and sends the massage 1001 to the controller 121. The massage 1001 includes an ID of the source processor 161, an ID of the destination processor 131, and an ID of the target virtual machine 170 for the displacement. These IDs may be represented by numeric characters, character string, or a combination thereof. The controller 121 having received the massage 1001 reads out each ID included in the massage 1001.

Next, in Step S102, the controller 121 obtains the requirements of all the tasks 142, 143, 152 and 153 to be executed on the processor 131 of the destination node 130, and a performance value of the processor 131. Specifically, the controller 121 sends a massage 1002 requesting information on the requirements of all the tasks and the performance value to the node 130 via the network 115. In response, the hypervisor 132 of the node 130 sends a massage 1003 including the requirements of all the tasks 142, 143, 152 and 153 to be executed on the processor 131 and the performance value of the processor 131 to the management server 120.

Here, an example of information included in the massage 1003 to be sent from the destination node 130 to the management server 120 is shown in FIG. 5. In the example of FIG. 5, although values included in the task requirements are set as natural numbers, it is not limited to the natural numbers while they can be represented by any format as long as they are positive numbers. The performance value of the processor 131 may represent a ratio of a necessary time for a certain processor to execute a certain amount of process to a necessary time for the processor 131 to execute the same amount of process. For instance, when the necessary time for a certain processor to execute the certain amount of process is set as d1 and the necessary time for the processor to execute the same amount of process is set as d2, the performance value of the processor 131 can be obtained as d1/d2.

Now explanation will be given returning to FIG. 4. When the management server 120 receives the massage 1003, the communication unit 124 of the management server 120 executes the protocol processing such as Ethernet®, TCP, IP, HTTP, or the like, on the massage 1003 and sends the massage 1003 to the controller 121. The controller 121 stores the requirements of all the tasks 142, 143, 152 and 153 executed on the processor 131, which are included in the massage 1003, in the storage 123.

Next, in Step S103, the management server 120 obtains requirements of all the tasks 172 and 173 operating on the virtual machine 170 from the destination node 160 and a performance value of the processor 161 of the node 160. Specifically, the controller 121 of the management server 120 sends a massage 1004 to the node 160 via the network 115. The massage 1004 includes an ID of the virtual machine 170 to be displaced. In response, the node 160 sends a massage 1005 including the requirements of all the tasks 172 and 173 operating on the virtual machine 170 and the performance value of the processor 161 to the management server 120 via the network 115.

Here, an example of information included in the massage 1005 to be sent from the source node 160 to the management server 120 shown in FIG. 6. In the example of FIG. 6, although values included in the task requirements are set as natural numbers, it is not limited to the natural numbers while they can be represented by any format as long as they are positive numbers.

Now explanation will be given returning to FIG. 4. When the management server 120 receives the massage 1005, the controller 121 of the management server 120 stores the task requirements described in the massage 1005 in the storage 123.

Next, in Step S104, the scheduler 122 of the management server 120 calculates optimal resources for the virtual machines 140, 150 and 170, respectively. Then, in Step S105, the scheduler 122 determines whether or not the processor 131 can satisfy the requirements of all the tasks 142, 143, 152, 153, 172 and 173 even if the virtual machines 140, 150 and 170 are executed on the processor 131. Details of the processes of Steps S104 and S105 will be described later on.

In the result of determination in Step S105, if the scheduler 122 determines that the requirements of all the tasks will be satisfied, the controller 121 of the management server 120 orders the node 130 to displace the virtual machine 170. Specifically, the controller 121 of the management server 120 generates a massage 1006. The massage 1006 includes an ID of the target virtual machine 170 for the displacement. The communication unit 124 of the management server 120 executes the protocol processing on the massage 1006 and sends the massage 1006 to the node 130. In response to receiving the massage 1006, the node 130 sends a massage 1007 to the management server 120. The massage 1007 includes a code indicating whether or not the node 130 accepts the displacement of the virtual machine 170. In the result of the determination in Step S105, if the scheduler 122 determines that the requirements of all the tasks will not be satisfied after the displacement of the virtual machine 170, the displacement of the virtual machine 170 having been ordered by the client 110 will be voided, and impossibility of the displacement is notified to the client 110. In response, the client 110 may display that the virtual machine 170 can not be displaced.

Next, in Step S107, the controller 121 of the management server 120 orders the node 160 to displace the virtual machine 170. Specifically, firstly, the controller 121 sends a massage 1008. The massage 1008 includes an ID of the target virtual machine 170 for the displacement. In response to receiving the massage 1008, the node 160 sends a massage 1009 to the management server 120. The massage 1009 includes a code indicated whether or not the node 160 accepts the displacement of the virtual machine 170.

Next, in Step S108, the node 160 sends an image 1010 of the virtual machine 170 to the node 130, and notifies completion of the displacement of the virtual machine 170 to the management server 120. The image 1010 includes an execution memory image of the virtual machine 170. Specifically, in response to receiving the execution memory image 1010, the node 130 reads in the execution memory image 1010 to a memory (not shown) and boots the virtual machine 170. Then, the node 130 sends a massage 1011 including a code indicating the completion of the displacement of the virtual machine 170 to the management server 120. When the controller 121 of the management server 120 receives the massage 1011, the controller 121 sends a massage 1012 to the client 110. The massage 1012 includes the code indicating the completion of the displacement of the virtual machine 170.

By the above processes, the displacement of the virtual machine 170 executed on the node 160 to the node 130 is completed.

The process in Step S104 of FIG. 4 will be described in detail. In Step S104, the scheduler 122 of the management server 120 calculates the optimal resources for the virtual machines 140, 150 and 170, respectively, and sends the results to the controller 121. In the first embodiment, the scheduler 122 can also calculate the optimal resources for other subjects not limited for particular virtual machines, tasks and processors. In the following explanation, the process executed by the scheduler 122 in Step S104 will be generalized.

A generalized algorithm executed in Step S104 is represented as optimal_resource. For executing optimal_resource, a different algorithm is_schedulable is used. Firstly, the algorithm is_schedulable will be explained.

When a virtual machine V, a processor C and a resource $\Gamma$ is allocated to is_schedulable, is_schedulable determines whether or not the processor C can execute all the tasks in the virtual machine V without missing the deadlines based on the resource $\Gamma$. Inputs to is_schedulable may be a workload W, the resource $\Gamma$, a performance value $\Phi(C)$ of the processor C, and a performance value $\Phi(C')$ of a source processor C'.

The workload W is a set constructed from requirements of all the tasks in the target virtual machine V. In the following formula (1), p(i) is a cycle of a periodic task i, and e(i) is an executing period per cycle. Here, it is assumed that p(i)<=(I+1).

$$W=\{(p(1),e(1)),(p(2),e(2)),\ldots,(p(n),e(n))\} \quad (1)$$

Output of is_schedulable is a true or false value. The output of is_schedulable being true indicates that the resource Γ is necessary and sufficient for being allocated to the virtual machine V in order for the processor C to execute all the tasks in the virtual machine V, which are represented as the workload W, without missing the deadlines. On the other hand, the output of is_schedulable is false indicates that the resource Γ is insufficient for the processor C to execute the workload W without missing the deadline.

FIG. 7 is an illustration showing an example of a pseudocode showing an algorithm of is_schedulable according to the first embodiment. In FIG. 7, processes from a first line to a sixth line obtain a new workload W' using the workload W and the performance value Φ(C). Here, e(i) is a period of time for every cycle when the task is executed on the processor C'.

By a process of the third line in FIG. 7, e(i) is changed into e'(i) which is a time for every cycle when the task is executed on the processor C. Thereby, the workload W' can be represented as a following formula (2).

$$W'=\{(p(1),e'(1)),(p(2),e'(2)),\ldots,(p(n),e'n)\} \quad (2)$$

Processes from a seventh line to a thirteenth line obtain a set U at check points. The check points are multiple numbers of p(i) which are not over p(n) with respect to all p(i)s where i is 1 to n. For example, when n=2, p(1)=2, and p(2)=5, the set U will be shown as U={2, 4, 5}.

A process of a fourteenth line in FIG. 7 draws up the check points in the set U in ascending order. Processes from a sixteenth line to a twenty-sixth line obtain a result of is_schedulable using the workload W' and the set U. A process of an eighteenth line compares results of functions called rbf and sbf.

In the first embodiment, by reducing the number of comparisons between the results of rbf and sbf, executability of one or more virtual machines is determined effectively.

For instance, in "Realizing Compositional Scheduling through Virtualization", Jaewoo Lee, Sisu Xi, Sanjian Chen, Linh T. X. Phan, Christopher Gill, Insup Lee, Chenyang Lu, and Oleg Sokolsky, IEEE Real-Time and Embedded Technology and Applications Symposium (RTAS), April, 2012, which is to be referred to as Reference 1, rbf is defined by a following formula (3). Here, an input to rbf is a workload W constructed from requirements of n tasks.

$$rbf(W,i,t) = \sum_{k \leq i} \left( \left\lceil \frac{t}{p(k)} \right\rceil \right) \cdot e(k) \quad (3)$$

The workload W in the formula (3) is represented by a following formula (4). In the formula (4), a natural number is defined as i<=n, a natural number t is defined as t<=p(n). Furthermore, the workload W is drawn up in order so that p(i) will be defined as p(i)<=p(i+1).

$$W=\{(e(0),p(1),\ldots,e(n),p(n))\} \quad (4)$$

Output of rbf defined by the above formula (3) corresponds to a resource demand in the first embodiment.

Moreover, according to Reference 1, sbf is defined by a following formula (5). Here, input to sbf is the resource Γ and the natural number t. Output of sbf corresponds to a resource supply in the first embodiment.

IN CASE WHERE $t \geq \Pi - \Theta$: (5)

$$sbf(\Gamma, t) =$$

$$\left\lfloor \frac{t-(\Pi-\Theta)}{\Pi} \right\rfloor \cdot \Theta + \max\left(t - 2(\Pi-\Theta) - \Pi \cdot \left\lfloor \frac{t-(\Pi-\Theta)}{\Pi} \right\rfloor, 0\right)$$

IN OTHER CASE: $sbf(\Gamma, t) = 0$

According to Reference 1, if a condition represented by a following formula (6) is satisfied when a certain workload W and a certain resource Γ are given, the resource Γ is capable of executing the tasks while satisfying all the requirements in the workload W. Therefore, by checking whether no not the condition represented by the formula (6) is satisfied for all the natural numbers i and t which satisfy 1<=i<=n, 0<t<=p(n), it is possible to obtain a result of is_schedulable.

$$\forall i, 1 \leq i \leq n, \exists t, 0 \leq t \leq p(n), s.t. sbf(\Gamma,t) \geq rbf(W,i,t) \quad (6)$$

In response to this, in the first embodiment, in order to reduce the number of comparisons between rbf and sbf, the processes from the sixteenth line to the twenty-sixth line in FIG. 7 apply check points included in the set U to the variable t in the formula (6). Specifically, in the process of the eighteenth line in FIG. 7, u(k) is given to rbf and sbf. The value u(k) is a k-th value in the set U of check points.

The algorithm is_schedulable shown in FIG. 7 further decreases the number of comparisons between rbf and sbf. Specifically, in the eighteenth line shown in FIG. 7, if t=u(k) does not satisfy the condition represented by the formula (6), verification of i is suspended, and verification of i+1 is executed.

Figure 8:
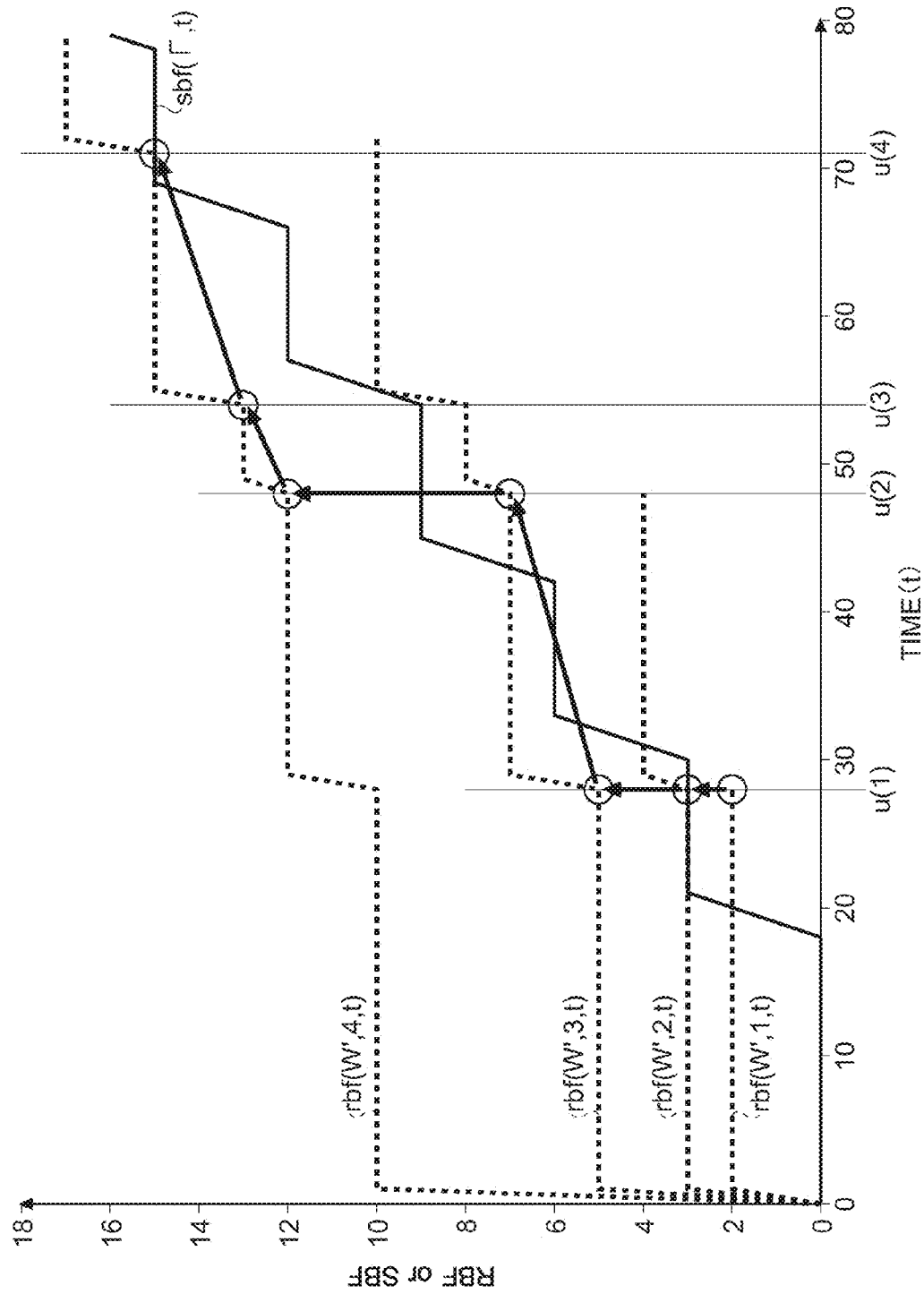
FIG. 8 is an illustration showing an example of a procedure when the algorithm of is_schedulable shown in FIG. 7 compares and verifies rbf and sbf.

FIG. 8 shows an example of a procedure when the algorithm of is_schedulable shown in FIG. 7 compares and verifies rbf and sbf. In the example shown in FIG. 8, the workload W' is W'={(27, 2), (48, 1), (71, 2), (79, 5)}, and the resource Γ is Γ=(12, 3). Furthermore, the number of elements of the workload W' is four, and the most longest cycle p(n) is 79. When the set U is obtained from the workload W7, the set U will be U={27, 48, 58, 71, 79}.

As shown in FIG. 8, in is_schedulable, firstly, rbf(W7, 1, u(1)) and sbf(Γ, u(1)) are compared. At this time, the set U is u(1)=27. Because of the condition rbf(W', 1, u(1))<=sbf(Γ, u(1)), rbf(W', 2, u(1)) and sbf(Γ, u(1)) are compared next. That is, a value of the next rbf located upward in FIG. 8 is verified.

Because of the condition rbf(W', 1, u(1))<=sbf(Γ, u(1)) is satisfied with respect to rbf(W7, 2, u(1)), a value rbf(W7, 3, u(3)) of the next rbf located upward is verified in the same way as above.

Now, the condition is rbf(W', 3, u(1))>sbf(Γ, u(1)). Therefore, next, rbf(W', 3, u(2)) and sbf(Γ, u(2)) are compared.

As shown in the above description, when the condition is rbf(W', i, u(k))<=sbf(Γ, u(k)), is_schedulable moves on to a comparison between rbf(W', i+1, u(k)) and sbf(Γ, u(k)), and when the condition is rbf(W', i, u(k))>sbf(Γ, u(k)), is_schedulable moves on to a comparison between rbf(W', i, u(k+1)) and sbf(Γ, u(k+1)).

Until i becomes n, is_schedulable compares rbf and sbf. If u(k) becomes p(n) in the middle of comparison by is_schedulable between rbf and sbf with respect to all 'i's that satisfy 1<=i<=n, a result of is_schedulable becomes false as shown in a twenty-second line in FIG. 7. On the other hand, if the comparison between rbf and sbf with respect to all 'i's satisfying 1<=i<=n is finished before u(k) becomes p(n), the result of is_schedulable becomes true. Above was the operation of is_schedulable.

Next, the algorithm of optimal_resource will be explained. Inputs to optimal_resource are the workload W and the performance value Φ(C). The workload W is a set of requirements of tasks. In the following explanation, it is assumed that the workload W is {(p(1), e(1)), (p(2), e(2)), ..., (p(n), e(n))} and p(i)<=p(i+1).

Output of optimal_resource is a resource Γ opt being optimal for the workload W. The algorithm optimal_resource can find a resource Γ with which Θ/Π becomes the smallest among Γs that return true when is_schedulable is applied, with respect to all the resource candidates Γ=(Π, Θ).

For example, optimal_resource applies is_schedulable to all Γ=(Π, Θ) in which the period Θ and the cycle Π are natural numbers. Or optimal_resource can be constructed from a more efficient algorithm shown in FIG. 9.

FIG. 9 is an illustration showing an example of a pseudocode showing an algorithm of optimal_resource according to the first embodiment. Processes from a third line to a seventeenth line in FIG. 9 checks whether or not the workload W can be executed on the processor C with the resource Γ and the performance value Φ(C) while consequently changing the cycle Π of the resource Γ from 1 to p(n). Specifically, a process of a ninth line executes is_schedulable(W, Γ, Φ(C)). A process of a fourth line changes a processor assigned period Θ of the resource Γ from Θ_first to Π for every cycle Π. The period Θ is an assigned period of the resource Γ to be firstly checked in every cycle Π. The algorithm optimal_resource changes Θ_first depending on the checking result of the resource Γ.

In processes from a sixth line to a twelfth line, if it is identified that it is not necessary to check assigned periods being greater than Θ as a result of checking the period Θ for a certain cycle Π, next, checking is started from a resource Γ=(Π+1, Θ).

In processes from a seventh line to a eleventh line, for preventing is_schedulable from being executed on values less than the period Θ, a value of the period Θ is temporarily stored in Θ_first.

A function B in the sixth line returns an occupancy Θ/Π of the given resource Γ=(Π, Θ). In processes from the sixth line to an eight line, if the occupancy of the resource Γ being a target of checking is higher than that of the optimal_resource Γ_opt having been found as an optimal resource by then, checking of resources Γ=(Π, Θ+α) in which α>0 and of which occupancy is obviously higher than that of the resource Γ is omitted.

A condition shown in the ninth line being true indicates that the processor C can execute the workload W by the resource Γ and the occupancy of the resource Γ is smaller than that of the optimal_resource Γ_opt being found by then. Therefore, a process of a tenth line updates the optimal resource Γ_opt.

Moreover, processes from the eleventh line to the twelfth line execute checking of a cycle Π+1 after updating Θ_first in order to omit checking of resources of which occupancy are higher than the occupancy of the updated optimal_resource Γ_opt.

A condition shown in the thirteenth line being true indicates that the processor C cannot satisfy the requirement of one of the tasks in the workload W even if the resource of which occupancy is 100% is used. Therefore, a code in a fourteenth line outputs error, and the process shown in FIG. 9 is finished. A process of an eighteenth line outputs the last optimal_resource Γ_opt.

Figure 10:
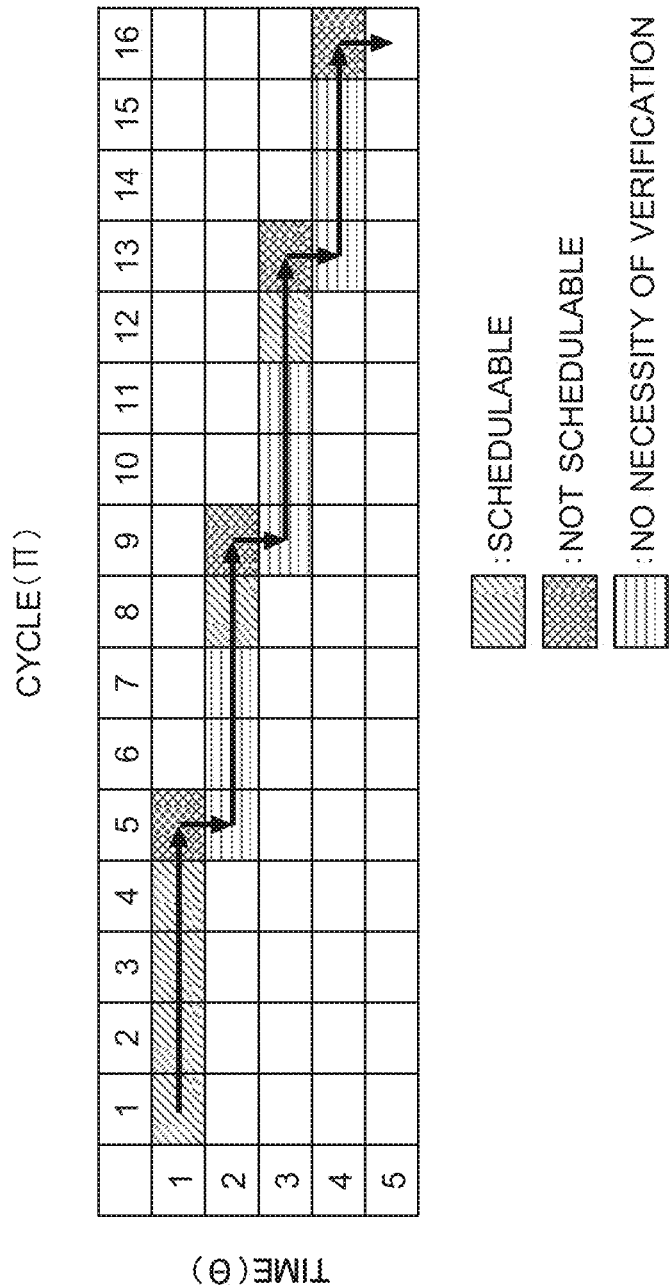
FIG. 10 is an illustration showing an example of an order of a resource Γ verified by the algorithm of optimal_resource.

An example of an order of a resource Γ verified by the algorithm of optimal_resource is shown in FIG. 10. In the example shown in FIG. 10, checking is started from a resource Γ=(1, 1). If the processor C can satisfy the requirements of all the tasks in the workload W using the resource Γ, as a result of verification on a certain resource Γ=(Π, Θ), next, a resource Γ=(Π+1, Θ) will be verified. On the other hand, if the processor cannot satisfy the requirements of all the tasks in the workload W when the resource Γ was used, next, a resource Γ=(Π, Θ+1) will be is verified. However, if the occupancy of the resource Γ is higher than that of the last optimal_resource Γ opt, next, a resource Γ=(Π+1, Θ) will be verified without verifying the resource Γ.

As described above, the operation of the scheduler 122 in Step S104 of FIG. 4 is constructed from is_schedulable and optimal_resource.

Next, the process in Step S105 will be explained. In Step S105, the scheduler 122 determines whether or not all the tasks will not exceed deadlines even if one or more given virtual machines are executed on a given processor. In Step S105, inputs to the scheduler 122 are a set R={Γ(1), Γ(2), ..., Γ(m)}, Γ(i)=(Π(i), Θ(i)), and the performance value Φ(C) of the processor C. Here, m expresses a number of virtual machines.

The scheduler 122 executes is_schedulable(R, (1, 1), Φ(C)), and when a result thereof is true, determines that all the tasks will not exceed the deadlines even if one or more given virtual machines are executed on the processor C. On the other hand, if the result of is_schedulable(R, (1, 1), Φ(C)) is false, the scheduler 122 determines that some of the tasks will exceed the deadline.

As described above, the management server 120 can calculate the optimal resource for the virtual machine in a short period by having one or both of is_schedulable and optimal_resource. Furthermore, the management server 120 can calculate whether a resource of a particular processor is enough for executing one or more virtual machines in a short period and inform the user of the result.

In addition, in the first embodiment, it is possible to include a period for executing a certain amount of process in the massages 1003 and 1005 in place of the performance value of the processor. In that case, the controller 121 calculates the performance value of the processor and sends the performance value to the scheduler 122.

Furthermore, in the first embodiment, one or both of Steps S104 and S105 can be executed by the scheduler 122 of the management server 120 before Step S106. For instance, it is possible that one or both of Steps S102 and S103 are executed before the management server 120 receives an order for displacement, creation, or the like, of a virtual machine from the client 110, and then, Steps S104 and S105 are executed. Thereby, it is possible to shorten the period of time that takes for the operation.

Moreover, in the first embodiment, it is acceptable that at least one of Steps S102 and S103 is not executed. For instance, if a performance value of a processor of each node and a requirement of a task in a virtual machine executed in each node are being previously stored in the storage 123 of the management server 120, it is possible to omit Steps S102 and S103. Thereby, it is possible to shorten a period of time for the operation.

Moreover, the scheduler 122 can use a different formula in place of the formula (3) for rbf. The function rbf shown in the formula (3) assumes that a task in a virtual machine is scheduled according to a scheduling policy called Ratemonotonic and each virtual machine is also scheduled according to Ratemonotonic.

Here, for instance, when priorities are given to one or more tasks 142 and 143 in the virtual machine 140, respectively, the scheduler 122 can use as rbf as shown in a following formula (7) for executing is_schedulable in Step S104. In this case, a requirement of a task with the highest priority in the virtual machine 140 is set as (p'(i), e'(i)).

$$rbf(W, i, t) = \sum_{k \leq i} \left( \left\lceil \frac{t}{p'(k)} \right\rceil \right) \cdot e'(k) \quad (7)$$

Likewise, when a priority is given to each virtual machine, the scheduler 122 can use the rbf shown in the formula (7) for executing is_schedulable in Step S105.

In Step S104, by using the rbf shown in the formula (7), an implementer of the OS in the virtual machine can assign a priority order regardless of the executing period of the task. Likewise, in Step S105, by using rbf shown in the formula (7), an implementer of a hypervisor can assign a priority order regardless of an executing period of a task.

Here, the resource calculated by the scheduler 122 for the certain virtual machine using optimal_resource in Step S104 is set as Γ=(Π, Θ). The hypervisor 132 can allocate the resource Γ to the virtual machine according to any scheduling policy as long as the executing period of the virtual machine given for every cycle Π is equal to or greater than Θ. For instance, the resource Γ may be allocated to the virtual machine using a scheduling policy in which priority is changed dynamically or in a round-robin manner.

Moreover, in the first embodiment, instead of a resource of a processor, a network resource can be scheduled using one or both of optimal_resource and is_schedulable. For example, if one or more virtual machines including one or more tasks operate in a single node with a finite number of network interfaces, it is necessary that the network interfaces are shared by a plurality of tasks or a plurality of virtual machines. In this case, when requirements of timings for data transmissions are given to the task or the virtual machine, it is possible to determine whether all such requirements can be satisfied, using the above-described structure.

In this case, the task requirement is a requirement to a period for using the network interface, but not a requirement to a period for using a processor. For example, the task requirement (p, e) indicates that a sum of periods for transmitting data from the network interface by the task is e for every cycle p.

Other that the period of use of a processor and the period of use of a network interface, the scheduler 122 can verify a period of use of bus in a node or a period of use of a disk I/O using is_schedulable or optimal_resource, and determine whether a resource of the node is enough to one or more given virtual machines or not. Thereby, it is possible to further reduce the possibility of diagnostic errors.

In the first embodiment, in addition to the sequence shown in FIG. 4, it is possible to arrange so that the scheduler 122 can verify deficiency or excess of the resource in the node before creating a new virtual machine, and send the verification result to the client.

Furthermore, in the first embodiment, it is also possible to arrange so that the scheduler 122 can receive requirements of one or more tasks, structures of one or more virtual machines, an amount of resource and assignment of virtual machines and tasks from the client, determine deficiency or excess of the resource, and send the result to the client. That is, the information processing system according to the first embodiment, the method and the program do not necessarily order an operation of a virtual machine to the node. Thereby, it is possible to construct a system where the user can plan an arrangement of one or more virtual OSs, for instance.

According to such structure described above, because it is possible to decrease the number of comparisons between rbf and sbf, it is possible to reduce the amount of processing at a time of calculating the optimal resource arrangement.

Second Embodiment

Next, a real-time scheduling apparatus, system and program according to a second embodiment will be described in detail. In the second embodiment, it is determined whether a node can execute all tasks using a designated resource while satisfying requirements of deadlines of all the tasks.

Figure 11:
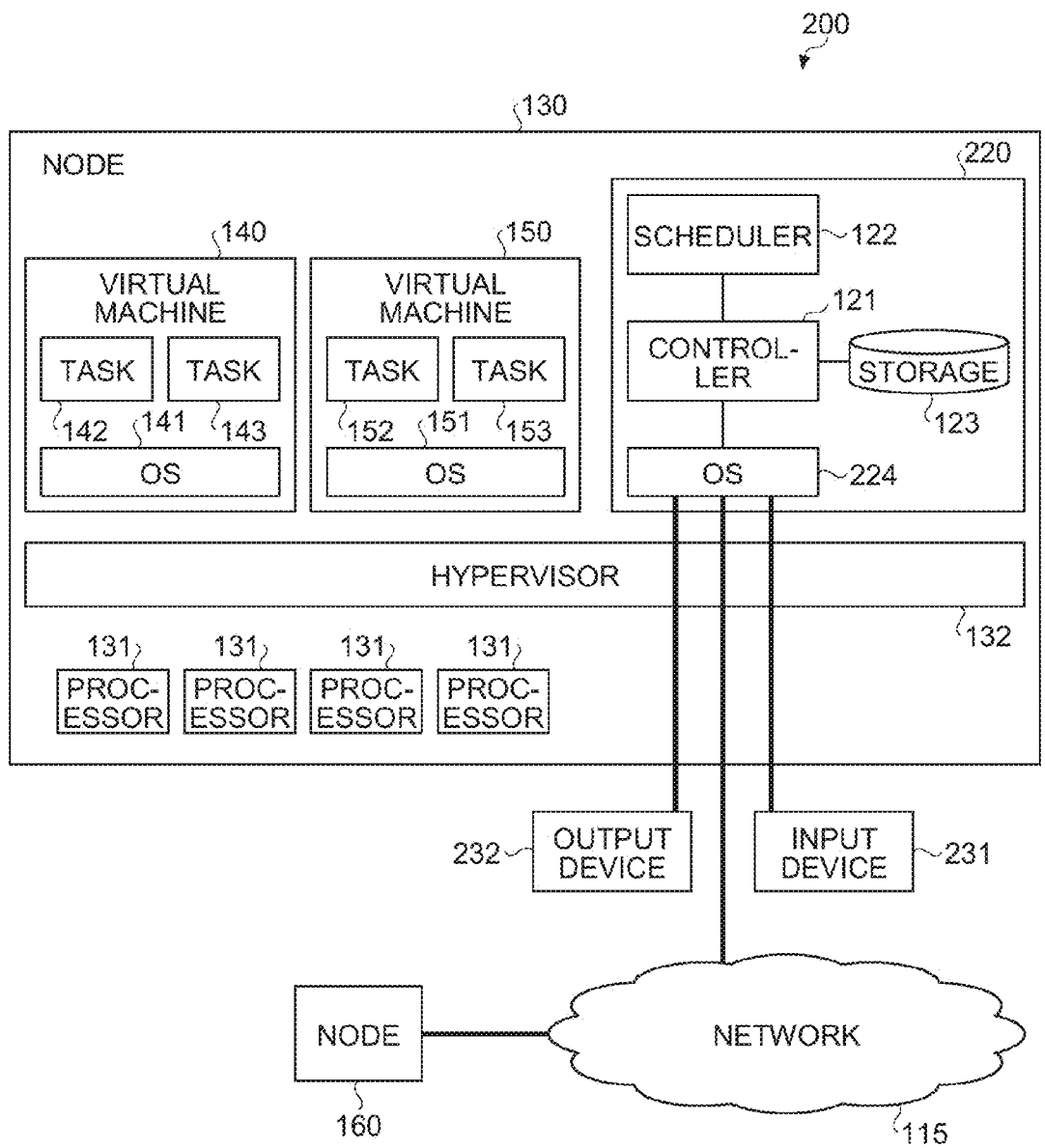
FIG. 11 is a block diagram showing an example of an outline structure of an information processing system according to a second embodiment.

FIG. 11 shows a block diagram of an example of an outline structure of the information processing system according to the second embodiment. As shown in FIG. 11, an information processing system 200 according to the second embodiment has a structure in that the controller 121, the scheduler 122 and the storage 123 in FIG. 1 are located in the node 130. Thereby, the management server 120 can be omitted. A virtual machine 220 also includes an OS 224. The other structures can be the same as the information processing system 100 shown in FIG. 1.

The information processing system 200 having such structure is especially effective in a case where a user directly operates the virtual machines 140 and 150 using an input device 231 and an output device 232 connected with the node 130 in a field such as a factory.

Operations of the scheduler 122 and the storage 123 shown in FIG. 11 may be the same as those of the scheduler 122 and the storage 123 shown in FIG. 1. Operations of the hypervisor 132, the processor 131, the virtual machines 140 and 150, the tasks 142, 143, 152 and 153, the OSs 141 and 151, and the nodes 130 and 160 may be the same as the operations thereof shown in FIG. 1.

In the virtual machine 220 shown in FIG. 11, the OS 224 is executed. The controller 121 and the scheduler 122 can be constructed as software included in a single task or different tasks.

The controller 121 can output a processing result to the output device 232 via the OS 224. An input to the controller 121 may be received from the input device 231 via the OS 224.

Figure 12:
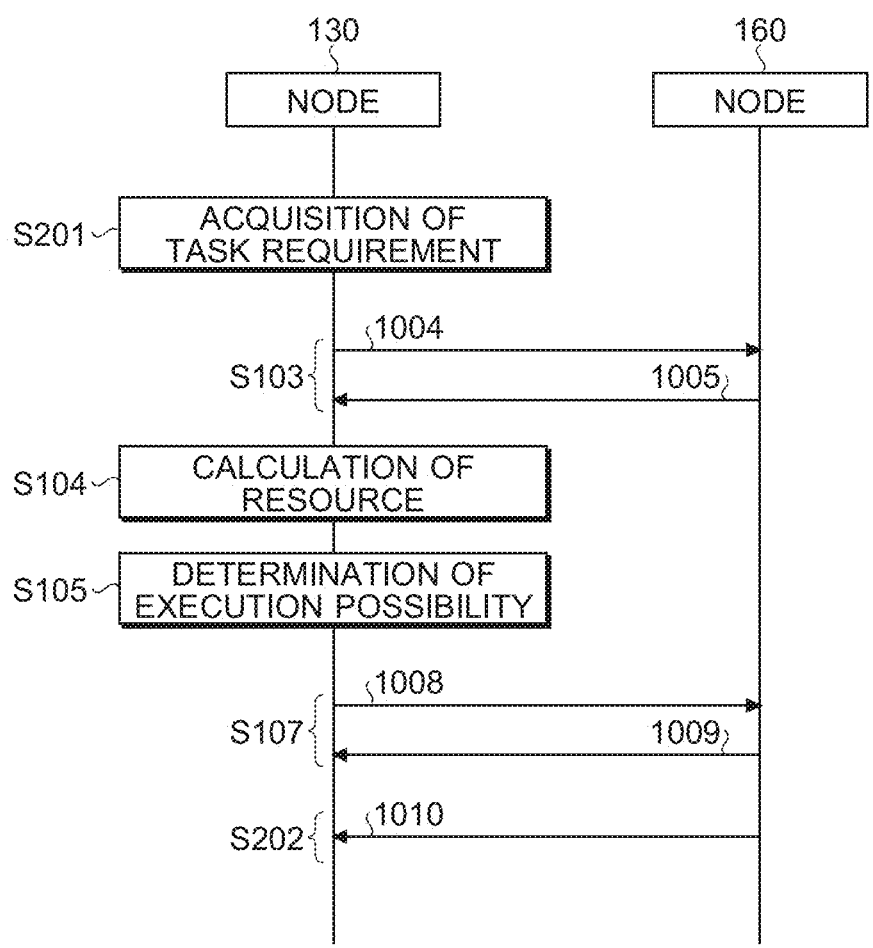
FIG. 12 is a sequence diagram showing an operation of the information processing system according to the second embodiment.

Next, an operation of the information processing system according to the second embodiment will be described in detail using a sequence diagram shown in FIG. 12. As shown in FIG. 12, firstly, in Step S201, the controller 121 of the node 130 receives an order for displacement of a virtual machine from the input device 231, and obtains the requirements of the tasks 142, 143, 152 and 153 being executed on the node 130. Following operations of Steps S103, S104, S105 and S107 may be the same as the operations of Steps S103, S104, S105 and S107 in FIG. 4, and the explanations thereof will be omitted.

In Step S202, the controller 121 of the node 130 receives the image 1010 of the virtual machine 170 from the node 160. The image 1010 includes an execution memory image of the virtual machine 170. Specifically, in response to receiving the execution memory image 1010, the controller 121 of the node 130 reads in the execution memory image 1010 to a memory (not shown) and boots the virtual machine 170. Then, the controller 121 of the node 130 sends a massage indicating the completion of the displacement of the virtual machine 170 to the output device 232.

As described above, even if functions located on the management server 120, for executing the scheduling of tasks, in the first embodiment are located on the node 130, it is possible to achieve the same effects as that of the first embodiment.

Third Embodiment

Next, a real-time scheduling apparatus, system and program according to a third embodiment will be described in detail. In the third embodiment, data is periodically obtained from one or more other devices being grouped, and necessary resources are calculated for each group. As a result, when the resource is insufficient, the client 110 is notified of such information. Furthermore, in the third embodiment, the cycle for obtaining data is reset.

Figure 13:
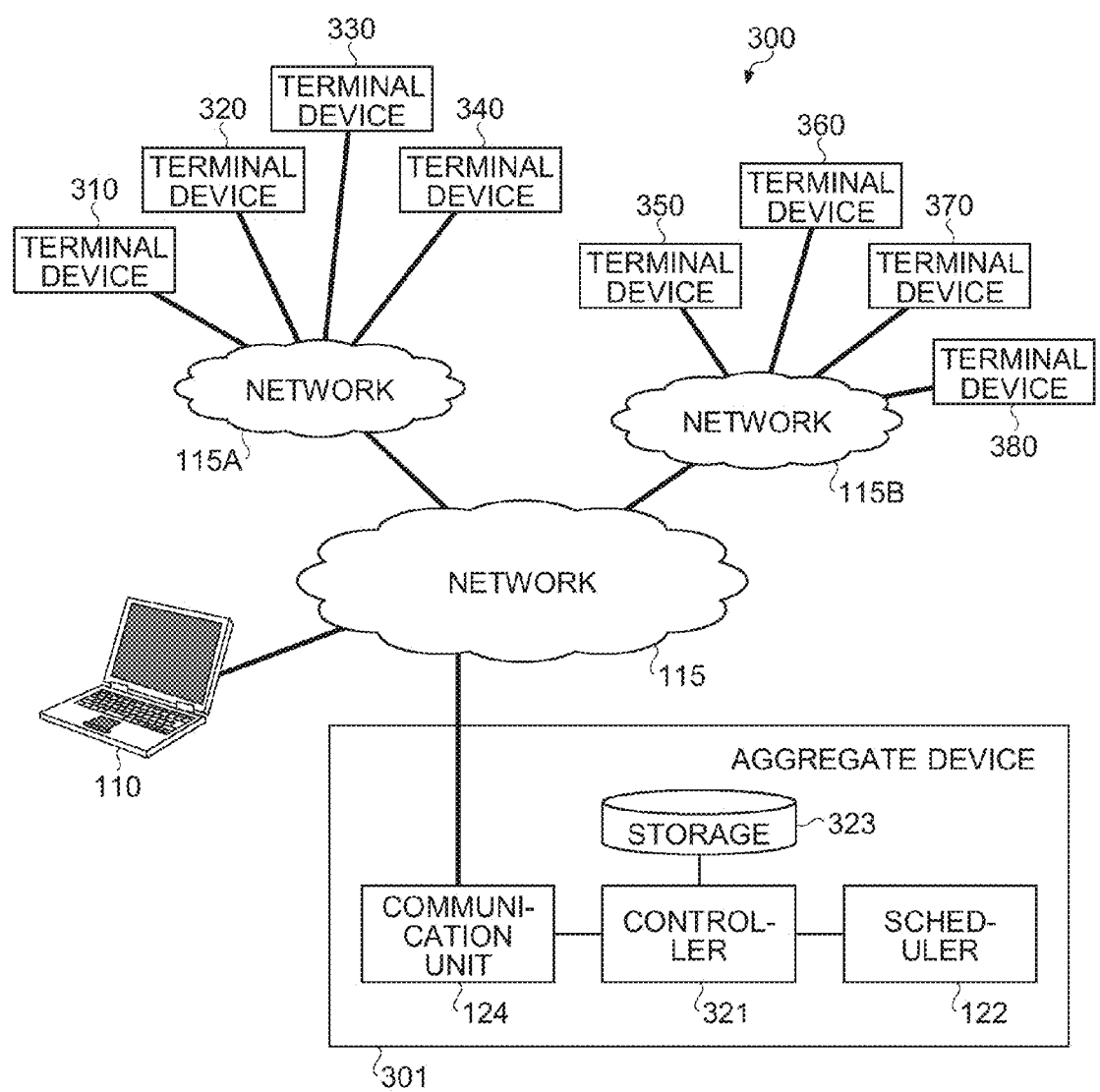
FIG. 13 is a block diagram showing an example of an outline structure of an information processing system according to a third embodiment.

FIG. 13 shows a block diagram of an example of an outline structure of the information processing system according to the third embodiment. As shown in FIG. 13, an information processing system 300 according to the third embodiment is constructed from an aggregate device 301, terminal devices 310 to 380, a client 110, and networks 115, 115A and 115B.

Each of the terminal devices 310 to 380 sends longitudinal data to the aggregate device 301, for instance. For instance, the longitudinal data may be a temperature, a humidity, an atmosphere, a density of gas or liquid, a flow rate of gas or liquid, an amount of power consumption, a power generation amount, and a traffic of human, vehicle, or the like.

In the example shown in FIG. 13, the terminal devices 310 to 380 are divided into two groups. A group including the terminal devices 310 to 340 which are connected to the network 115A is defined as a group A, and a group including the terminal devices 350 to 380 which are connected to the network 115B is defined as a group B.

The aggregate device 301 corresponds to the management server 120 in the first embodiment, for instance. The aggregate device 301 periodically obtains data from the terminal devices 310 to 380. Furthermore, the aggregate device 301 calculates a necessary resource for the groups A and B. For instance, when the resource for each of the groups A and B is insufficient, the aggregate device 301 may send an error massage to the client 110.

When the aggregate device 301 receives data from two or more terminal devices among the terminal devices 310 to 380, there is a possibility that the data may be jammed around the network 115 connected to the aggregate device 301. In such a case, the aggregate device 301 may not be able to obtain data from a certain terminal device at the predetermined cycle. Therefore, the aggregate device 301 calculates the necessary resource for each of the groups A and B based on requirements of the terminal devices 310 to 380.

In the third embodiment, a resource is defined by a pair ($\Pi$, $\Theta$) being a cycle $\Pi$ during which the network 115 is used and a sum $\Theta$ of usage periods, for instance. Each requirement of the terminal devices 310 to 380 is defined by a pair (p, e) being a cycle p for obtaining data and a period of time e for obtaining data that takes per cycle.

The aggregate device 301 shown in FIG. 13 has the communication unit 124, a controller 321, a storage 323 and the scheduler 122. The communication unit 124 and the scheduler 122 may be the same as the communication unit 124 and the scheduler 122 of the management server 120 shown in FIG. 1, respectively.

The storage 323 stores the requirements of the terminal devices 310 to 380. The controller 321 obtains data from the terminal devices 310 to 380 at a predetermined cycle. Furthermore, the controller 321 measures a period of time e that takes for obtaining data for each of the terminal devices 310 to 380, and stores the measured time in the storage 323 together with the predetermined cycle for each of the terminal devices 310 to 380.

Any method for measuring time can be applied to the method for measuring the period of time e by the controller 321. For instance, the controller 321 can define that the period of time e is T/2, T being a round trip time starting from a transmission of a massage with the same size as a regularly received data to a reception of data from each of the terminal devices 310 to 380.

The controller 321 applies a set of requirements of the terminal devices 310 to 340 which belong to the set A to optimal_resource, and obtains a resource $\Gamma(A)$. Here, a performance value of the processor is defined as 1. Likewise, the controller 321 applies a set of the requirements of the terminal devices 350 to 380 which belongs to the set B to optimal_resource, and obtains a resource $\Gamma(B)$.

For instance, if the resource $\Gamma(A)$ and the resource $\Gamma(B)$ are disbalance, the controller 321 resets the cycle for obtaining data from one of the terminal devices 310 to 380. Or the controller 321 determines whether or not an occupancy of resource is over 1 by defining a set including the resource $\Gamma(A)$ and the resource $\Gamma(B)$ as the resource $\Gamma$ and applying the resource $\Gamma$ to is_schedulable. Here, a performance value for applying is_schedulable is set as 1. When the occupancy of the resource $\Gamma$ is over 1, the controller 321 may send an error massage to the client 110. Or the controller 321 may reset the cycle for obtaining data.

As described above, the structures according to the first and second embodiments can be applied to the information processing system 300 for scheduling a network resource.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A scheduling apparatus comprising:

a controller, comprising hardware, configured to determine, using one or more task requirements of each virtual machine in a first terminal device that executes one or more virtual machines, a performance value of a first processor in the first terminal device, determine, using one or more task requirements of each virtual machine in a second terminal device that executes one or more virtual machines, a performance value of a second processor in the second terminal device, determine that a resource of the second processor can meet the one or more task requirements of each virtual machine in the first terminal device and the one or more task requirements of each virtual machine in the second terminal device, migrate each of the one or more virtual machines in the first terminal device to the second terminal device, determine whether the resource of the second processor can execute the virtual machines in the second terminal device by a first cycle and a first executing period per cycle, determine, when the controller determines that the resource of the second processor can execute the virtual machines in the second terminal device by the first cycle and the first executing period per cycle, whether the resource of the second processor can execute the virtual machines in the second terminal device by a second cycle, which is sum of the first cycle and a single unit, and the first executing period per cycle, determine, when the controller determines that the resource of the second processor cannot execute the virtual machines in the second terminal device by the first cycle and the first executing period per cycle, whether the resource of the second processor can execute the virtual machines in the second terminal device by the first cycle and a second executing period per cycle, which is sum of the first executing period per cycle and a single unit, specify a cycle and an executing period per cycle of which a ratio of the executing period per cycle to the cycle is the smallest from among pairs of a cycle and an executing period per cycle for which the controller determines that the virtual machines can be executed on the second terminal device, and assign the specified cycle and the specified executing period per cycle to the virtual machines in the second terminal device.

2. The apparatus of claim 1, wherein the controller is further configured to calculate two or more check points for comparing a resource demand necessary for the second processor and a resource supply supplied to the second processor, the check points are equal to or less than a maximum cycle among cycles of one or more tasks in the one or more virtual machines in the second terminal device and cycles of one or more tasks in the at least one virtual machine among the one or more virtual machines in the first terminal device, and are multiple numbers of each of the cycles, and the controller is further configured to:

calculate a first resource demand and a first resource supply with respect to a combination of a first check point among the two or more check points and a first group including the one or more task requirements of the one or more virtual machines in the second terminal device and the one or more task requirements of the at least one virtual machine among the one or more virtual machines in the first terminal device, when the first resource demand is equal to or smaller than the first resource supply, calculate a second resource demand and a second resource supply with respect to a combination of the first check point and a second group including one or more task requirements of another virtual machine being different from the at least one virtual machine among the one or more virtual machines in the first terminal device in addition to the task requirements of the first group, when the first or second resource demand is larger than the first or second resource supply, calculate a third resource demand and a third resource supply with respect to a combination of the first or second group and a second check point being larger than the first check point, and if there is at least one check point at which the resource demand is smaller than the resource supply with respect to the first or second group, determine that the resource of the second processor is enough as a resource required by the group including the at least one virtual machine among the one or more virtual machines in the first terminal device in addition to the one or more virtual machines in the second terminal device.

3. A system comprising:
a scheduling apparatus comprising:
a controller, comprising hardware, configured to
determine, using one or more task requirements of each virtual machine in a first terminal device that executes one or more virtual machines, a performance value of a first processor in the first terminal device, determine, using one or more task requirements of each virtual machine in a second terminal device that executes one or more virtual machines, a performance value of a second processor in the second terminal device, determine that a resource of the second processor can meet the one or more task requirements of each virtual machine in the first terminal device and the one or more task requirements of each virtual machine in the second terminal device, migrate each of the one or more virtual machines in the first terminal device to the second terminal device, determine whether the resource of the second processor can execute the virtual machines in the second terminal device by a first cycle and a first executing period per cycle, determine, when the controller determines that the resource of the second processor can execute the virtual machines in the second terminal device by the first cycle and the first executing period per cycle, whether the resource of the second processor can execute the virtual machines in the second terminal device by a second cycle, which is sum of the first cycle and a single unit, and the first executing period per cycle, determine, when the controller determines that the resource of the second processor cannot execute the virtual machines in the second terminal device by the first cycle and the first executing period per cycle, whether the resource of the second processor can execute the virtual machines in the second terminal device by the first cycle and a second executing period per cycle, which is sum of the first executing period per cycle and a single unit, specify a cycle and an executing period per cycle of which a ratio of the executing period per cycle to the cycle is the smallest from among pairs of a cycle and an executing period per cycle for which the controller determines that the virtual machines can be executed on the second terminal device, assign the specified cycle and the specified executing period per cycle to the virtual machines in the second terminal device, and execute the virtual machines in the second terminal device.

4. A method executed by a computer for scheduling a processing resource, the method including:
determining, using one or more task requirements of each virtual machine in a first terminal device that executes one or more virtual machines, a performance value of a first processor in the first terminal device;

determining, using one or more task requirements of each virtual machine in a second terminal device that executes one or more virtual machines, a performance value of a second processor in a second terminal device;

determining that a resource of the second processor can meet the one or more task requirements of each virtual machine in the first terminal device and the one or more task requirements of each virtual machine in the second terminal device;

migrating each of the one or more virtual machines in the first terminal device to the second terminal device;

determining whether the resource of the second processor can execute the virtual machines in the second terminal device by a first cycle and a first executing period per cycle;

determining, when it is determined that the resource of the second processor can execute the virtual machines in the second terminal device by the first cycle and the first executing period per cycle, whether the resource of the second processor can execute the virtual machines in the second terminal device by a second cycle, which is sum of the first cycle and a single unit, and the first executing period per cycle;

determining, when it is determined that the resource of the second processor cannot execute the virtual machines in the second terminal device by the first cycle and the first executing period per cycle, whether the resource of the second processor can execute the virtual machines in the second terminal device by the first cycle and a second executing period per cycle, which is sum of the first executing period per cycle and a single unit;

specifying a cycle and an executing period per cycle of which a ratio of the executing period per cycle to the cycle is the smallest from among pairs of a cycle and an executing period per cycle for which it is determined that the virtual machines can be executed on the second terminal device; and assigning the specified cycle and the specified executing period per cycle to the virtual machines in the second terminal device.

5. The method of claim 4 further including calculating two or more check points for comparing a resource demand necessary for the second processor and a resource supply supplied to the second processor, wherein the check points are equal to or less than a maximum cycle among cycles of one or more tasks in the one or more virtual machines in the second terminal device and cycles of one or more tasks in the at least one virtual machine among the one or more virtual machines in the first terminal device, and are multiple numbers of each of the cycles, and the method further includes:

calculating a first resource demand and a first resource supply with respect to a combination of a first check point among the two or more check points and a first group including the one or more task requirements of the one or more virtual machines in the second terminal device and the one or more task requirements of the at least one virtual machine among the one or more virtual machines in the first terminal device;

when the first resource demand is equal to or smaller than the first resource supply, calculating a second resource demand and a second resource supply with respect to a combination of the first check point and a second group including one or more task requirements of another virtual machine being different from the at least one virtual machine among the one or more virtual machines in the first terminal device in addition to the task requirements of the first group;

when the first or second resource demand is larger than the first or second resource supply, calculating a third resource demand and a third resource supply with respect to a combination of the first or second group and a second check point being larger than the first check point; and if there is at least one check point at which the resource demand is smaller than the resource supply with respect to the first or second group, determining that the resource of the second processor is enough as a resource required by the group including the at least one virtual machine among the one or more virtual machines in the first terminal device in addition to the one or more virtual machines in the second terminal device.

6. A non-transitory computer readable medium including a program for operating a computer which schedules a processor resource, the program comprising instructions for:

determining, using one or more task requirements of each virtual machine in a first terminal device that executes one or more virtual machines, a performance value of a first processor in the first terminal device;

determining, using one or more task requirements of each virtual machine in a second terminal device that executes one or more virtual machines, a performance value of a second processor in a second terminal device;

determining that a resource of the second processor can meet the one or more task requirements of each virtual machine in the first terminal device and the one or more task requirements of each virtual machine in the second terminal device;

migrating each of the one or more virtual machines in the first terminal device to the second terminal device;

determining whether the resource of the second processor can execute the virtual machines in the second terminal device by a first cycle and a first executing period per cycle;

determining, when it is determined that the resource of the second processor can execute the virtual machines in the second terminal device by the first cycle and the first executing period per cycle, whether the resource of the second processor can execute the virtual machines in the second terminal device by a second cycle, which is sum of the first cycle and a single unit, and the first executing period per cycle;

determining, when it is determined that the resource of the second processor cannot execute the virtual machines in the second terminal device by the first cycle and the first executing period per cycle, whether the resource of the second processor can execute the virtual machines in the second terminal device by the first cycle and a second executing period per cycle, which is sum of the first executing period per cycle and a single unit;

specifying a cycle and an executing period per cycle of which a ratio of the executing period per cycle to the cycle is the smallest from among pairs of a cycle and an executing period per cycle for which it is determined that the virtual machines can be executed on the second terminal device; and assigning the specified cycle and the specified executing period per cycle to the virtual machines in the second terminal device.

7. The program of claim 6 including further instructions for:

calculating two or more check points for comparing a resource demand necessary for the second processor and a resource supply supplied to the second processor, wherein the check points are equal to or less than a maximum cycle among cycles of one or more tasks in the one or more virtual machines in the second terminal device and cycles of one or more tasks in the at least one virtual machine among the one or more virtual machines in the first terminal device, and are multiple numbers of each of the cycles, and the program comprises further instructions for:

calculating a first resource demand and a first resource supply with respect to a combination of a first check point among the two or more check points and a first group including the one or more task requirements of the one or more virtual machines in the second terminal device and the one or more task requirements of the at least one virtual machine among the one or more virtual machines in the first terminal device;

when the first resource demand is equal to or smaller than the first resource supply, calculating a second resource demand and a second resource supply with respect to a combination of the first check point and a second group including one or more task requirements of another virtual machine being different from the at least one virtual machine among the one or more virtual machines in the first terminal device in addition to the task requirements of the first group;

when the first or second resource demand is larger than the first or second resource supply, calculating a third resource demand and a third resource supply with respect to a combination of the first or second group and a second check point being larger than the first check point; and if there is at least one check point at which the resource demand is smaller than the resource supply with respect to the first or second group, determining that the resource of the second processor is enough as a resource required by the group including the at least one virtual machine among the one or more virtual machines in the first terminal device in addition to the one or more virtual machines in the second terminal device.

* * * * *